United States Patent
Helton et al.

(10) Patent No.: US 11,370,470 B1
(45) Date of Patent: Jun. 28, 2022

(54) SWIVEL SEAT STROLLER APPARATUS

(71) Applicants: Suzanne Helton, Murfeesboro, TN (US); J. Scott Brickell, Franklin, TN (US)

(72) Inventors: Suzanne Helton, Murfeesboro, TN (US); J. Scott Brickell, Franklin, TN (US)

( * ) Notice: Subject to any disclaimer, the term of this patent is extended or adjusted under 35 U.S.C. 154(b) by 0 days.

(21) Appl. No.: 17/219,934

(22) Filed: Apr. 1, 2021

(51) Int. Cl.
| | |
|---|---|
| *B62B 9/12* | (2006.01) |
| *B62B 7/08* | (2006.01) |
| *B62B 7/06* | (2006.01) |
| *B62B 9/10* | (2006.01) |
| *B62B 9/24* | (2006.01) |
| *B62B 9/26* | (2006.01) |
| *A47D 13/04* | (2006.01) |

(52) U.S. Cl.
CPC .............. *B62B 7/083* (2013.01); *B62B 7/064* (2013.01); *B62B 7/086* (2013.01); *B62B 9/102* (2013.01); *B62B 9/104* (2013.01); *B62B 9/12* (2013.01); *B62B 9/24* (2013.01); *B62B 9/26* (2013.01); *A47D 13/04* (2013.01)

(58) Field of Classification Search
CPC ......... B62B 2206/00; B62B 7/06; B62B 9/28; B62B 7/00; B62B 9/102; B62B 9/26; B62B 7/04; B62B 9/12; B62B 9/24; B62B 9/14; B62B 9/104; A47D 13/04; A47D 13/107
See application file for complete search history.

(56) References Cited

U.S. PATENT DOCUMENTS

| | | | | |
|---|---|---|---|---|
| 1,381,415 A | | 6/1921 | Gudeli | |
| 2,415,146 A | * | 2/1947 | Nanna | A47D 13/043 280/47.38 |
| 2,427,550 A | * | 9/1947 | Collura | B62B 7/04 280/7.1 |
| 2,451,956 A | * | 10/1948 | Kemper | B62B 7/06 280/650 |
| 2,606,593 A | * | 8/1952 | Beurskens | A47D 13/043 297/188.2 |
| 2,631,651 A | * | 3/1953 | Boysel | B62B 9/102 297/344.21 |
| 2,884,046 A | * | 4/1959 | Patrick | A47D 1/06 280/47.35 |
| 2,471,004 A | | 5/1959 | Moster | |
| 2,907,372 A | | 10/1959 | Leger | |
| 4,487,428 A | * | 12/1984 | Harada | B62B 7/12 280/649 |
| 6,012,731 A | * | 1/2000 | Liu | A47D 13/043 280/87.051 |

(Continued)

*Primary Examiner* — Emma K Frick

(57) ABSTRACT

A swivel seat stroller apparatus for providing varied seating for a child includes a frame including a plurality of wheel arms, a frame back, and a frame front. A plurality of wheels is coupled to the plurality of wheel arms. A seat back is coupled to the frame back. A seat bottom is coupled to the frame and has a seat aperture extending therethrough. A swivel seat has a rim coupled to the seat bottom and a harness rotatably coupled to the rim. A pad back is coupled to the seat back. A pad bottom is coupled to the pad back and moves between an open position covering the seat bottom and a closed position parallel with the pad back. A plurality of engagement members is coupled to the pad back and the pad bottom to selectively secure the pad bottom in the closed position.

14 Claims, 4 Drawing Sheets

(56) References Cited

U.S. PATENT DOCUMENTS

| | | | | |
|---|---|---|---|---|
| 6,863,287 | B2 * | 3/2005 | Myers | A47D 13/043 280/87.051 |
| 7,025,364 | B1 * | 4/2006 | Clarke | B62B 9/26 280/87.051 |
| 7,234,722 | B1 * | 6/2007 | Madigan | B62B 9/104 280/47.38 |
| 8,128,118 | B2 * | 3/2012 | Friisdahl | B62B 7/12 280/47.38 |
| 8,162,333 | B1 * | 4/2012 | Bartlett | A47D 13/043 280/87.051 |
| 8,256,793 | B1 * | 9/2012 | Krieger | B62B 9/26 280/647 |
| 8,398,143 | B1 * | 3/2013 | Haley | B62B 7/142 297/344.21 |
| 8,505,957 | B2 * | 8/2013 | Bizzell | B62B 7/06 280/647 |
| 8,567,866 | B2 * | 10/2013 | Carimati Di Carimate | B62B 7/14 297/487 |
| 8,596,670 | B2 * | 12/2013 | di Carimate | B62B 7/142 280/47.38 |
| 8,851,487 | B2 * | 10/2014 | Maxie | A47D 15/006 280/87.051 |
| 8,905,427 | B2 * | 12/2014 | Katz | B60B 33/025 280/47.38 |
| 8,978,947 | B1 * | 3/2015 | Schneidau | B60R 11/02 280/47.38 |
| 9,119,508 | B2 * | 9/2015 | Reed | B62B 9/00 |
| 9,365,231 | B1 * | 6/2016 | Rajput | B62B 9/12 |
| 9,701,331 | B2 * | 7/2017 | Burns | B62B 7/04 |
| 9,789,893 | B2 * | 10/2017 | Young | B62K 13/04 |
| 9,937,945 | B1 * | 4/2018 | Phillips | B62B 9/102 |
| 10,407,089 | B1 * | 9/2019 | Matranga | A47D 13/043 |
| 10,557,602 | B1 * | 2/2020 | Dejesus | B62B 9/26 |
| 10,588,425 | B1 * | 3/2020 | Jordan | B62B 9/26 |
| 11,008,035 | B1 * | 5/2021 | Walker | B62B 9/08 |
| 11,110,951 | B2 * | 9/2021 | Gordon | A47D 13/043 |
| 2013/0249202 | A1 * | 9/2013 | White | B62B 9/26 280/769 |

* cited by examiner

SWIVEL SEAT STROLLER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to stroller devices and more particularly pertains to a new stroller device for providing varied seating for a child. The present device includes a foldable seat pad to selectively cover or expose a swivel seat. The seat pad may have integrated vibroacoustic speakers to soothe the child.

(2) Description of Related Art Including Information Disclosed Under 37 CFR 1.97 and 1.98

The prior art relates to stroller devices. Existing devices have integrated swivel seats onto wheeled carriages. These devices, however, lack an upright seat with a foldable seat pad to cover the swivel seat and allow for an alternate seated stroller position. Known devices also lack an integrated vibroacoustic system.

BRIEF SUMMARY OF THE INVENTION

An embodiment of the disclosure meets the needs presented above by generally comprising a frame including a plurality of wheel arms, a frame back, and a frame front. A handle is coupled to the frame. A plurality of wheels is coupled to the plurality of wheel arms. A seat back is coupled to the frame. The seat back is coupled to the frame back. A seat bottom is coupled to the frame. The seat bottom has a seat aperture extending therethrough. A swivel seat is coupled to the seat bottom. The swivel seat has a rim coupled to a seat top side of the seat bottom and a harness rotatably coupled to the rim. The harness extends through the seat aperture and has a pair of leg apertures. A pad back is coupled to the seat back. A pad bottom is coupled to the pad back. The pad bottom is foldable and moves between an open position covering the seat bottom and a closed position parallel with the pad back. A plurality of engagement members is coupled to the pad back and the pad bottom. The plurality of engagement members selectively secures the pad bottom in the closed position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
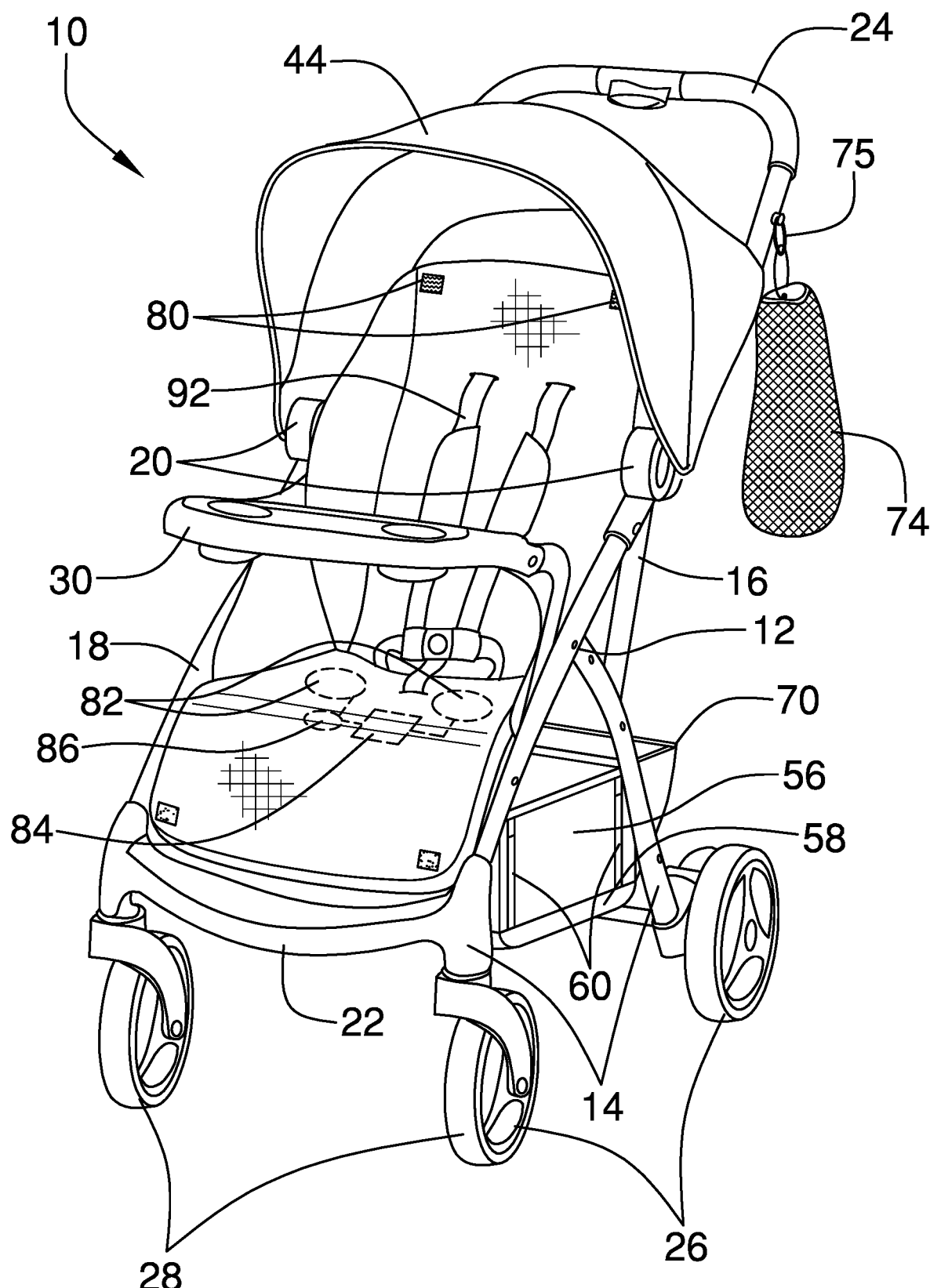
FIG. 1 is an isometric view of a swivel seat stroller apparatus according to an embodiment of the disclosure.

With reference now to the drawings, and in particular to FIGS. 1 through 4 thereof, a new stroller device embodying the principles and concepts of an embodiment of the disclosure and generally designated by the reference numeral 10 will be described.

As best illustrated in FIGS. 1 through 4, the swivel seat stroller apparatus 10 generally comprises a frame 12 including a plurality of wheel arms 14, a frame back 16, and a frame front 18. The frame 12 may be foldable with the frame front 18 having a pair of frame hinges 20. The frame front 18 may include a footrest 22. A handle 24 is coupled to the frame 12. The handle 24 may be rubberized for improved user grip and comfort.

A plurality of wheels 26 is coupled to the frame 12. The plurality of wheels 26 is coupled to the plurality of wheel arms 14. A pair of front wheels 28 of the plurality of wheels may be swivelable for easier steering of the apparatus 10. A tray 30 is coupled to the frame 12. The tray 30 has a pair of tray arms 32 pivotably coupled to the frame front 18. The tray 30 may also include a pair of cupholders 33. The tray 30 may fold down towards the footrest 22 when not in use.

A seat back 34 is coupled to the frame 12. The seat back 34 is coupled to the frame back 16 and may adjustably recline. A seat bottom 36 is coupled to the frame 12. The seat bottom 36 extends from the seat back 34 and may bend towards the footrest 22. The seat bottom 36 has a seat aperture 38 extending therethrough. The seat bottom 36 may also have a plurality of toy insert receptacles 40. Each toy insert receptacle 40 may have a ball catch 42. A canopy 44 may be coupled to the frame 12. The canopy 44 is coupled to the frame front 18 and is collapsible to selectively cover and shade the seat back 34.

A swivel seat 46 is coupled to the seat bottom 36. The swivel seat 46 has a rim 48 coupled to a seat top side 50 of the seat bottom 36 and a harness 52 rotatably coupled to the rim 48. The rim 48 may be padded and rounded for user comfort. The harness 52 extends through the seat aperture 38 and has a pair of leg apertures 54. An infant may thus be placed within the swivel seat 46 to be supported by the harness 52 and be free to rest on the rim 48 and rotate as desired. A foot basket 56 may be coupled to frame 12. The foot basket 56 is positioned below the swivel seat 46 to support the child's feet and protect them from harm. The foot basket 56 has a basket bottom 58 that may be supported by a plurality of adjustable basket straps 60 to raise and lower the basket bottom 58 as desired depending on the length of the child's legs.

There may also be a plurality of toys 62. Each toy 62 has a post 64 selectively engageable with the plurality of toy insert receptacles 40. The post 64 may have a spring ball 66 to engage the ball catch 42. The post 64 may also have a stopper ring 68 above the spring ball 66 to stabilize the respective toy 62 on the seat bottom 36. A storage compartment 70 may be coupled to the frame 12 adjacent the foot basket 56. The storage compartment 70 has a curved storage back side 72 to maximize capacity while preventing interference with the user's legs while pushing the handle 24. The plurality of toys 62 may be stored within the storage compartment 70 or may alternatively be stored within a toy storage bag 74. The toy storage bag 74 may be mesh and may have a bag clip 75 selectively engaged with the frame 12 adjacent the handle 24.

Figure 2:
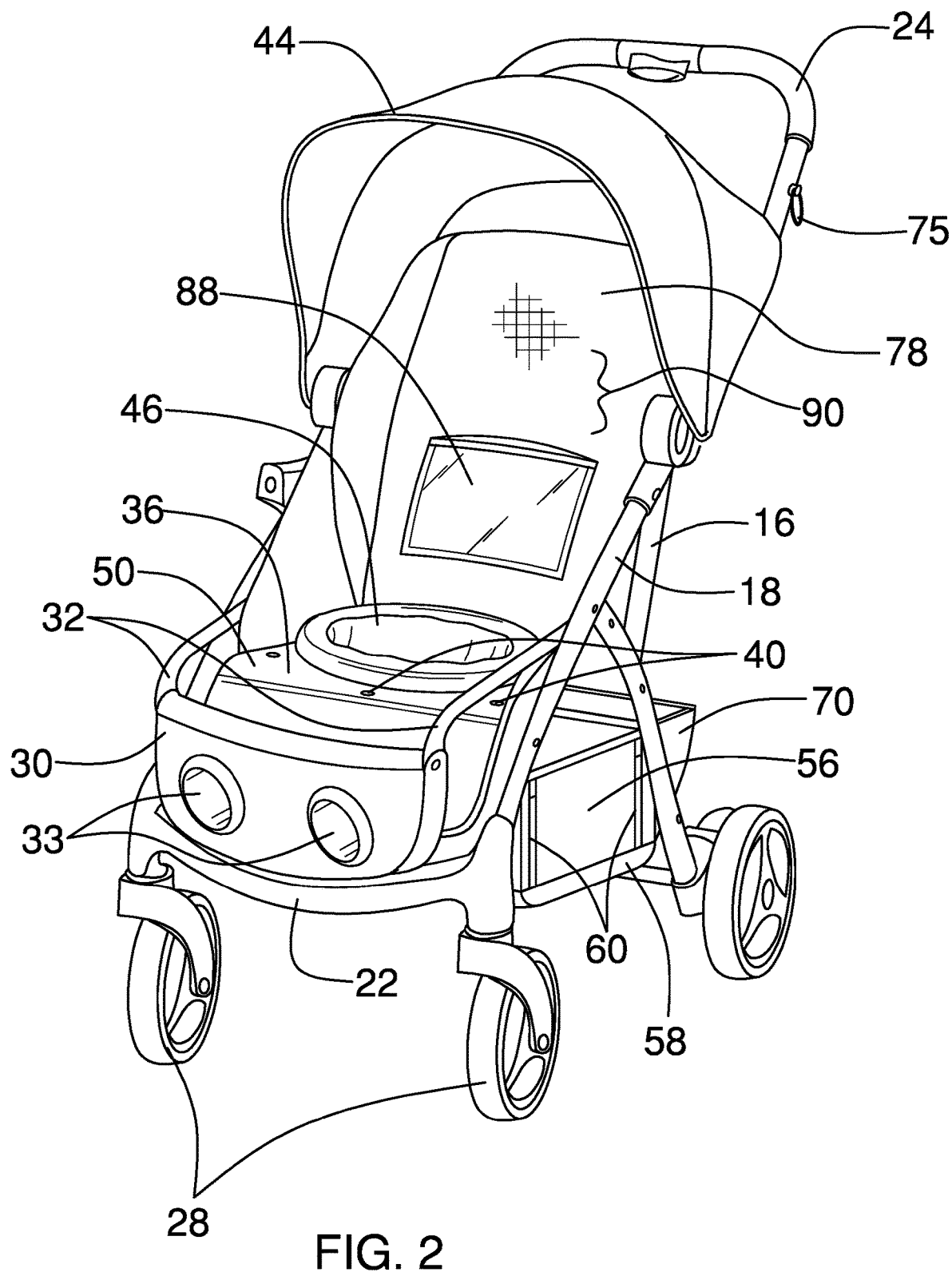
FIG. 2 is an isometric view of an embodiment of the disclosure.
Figure 3:
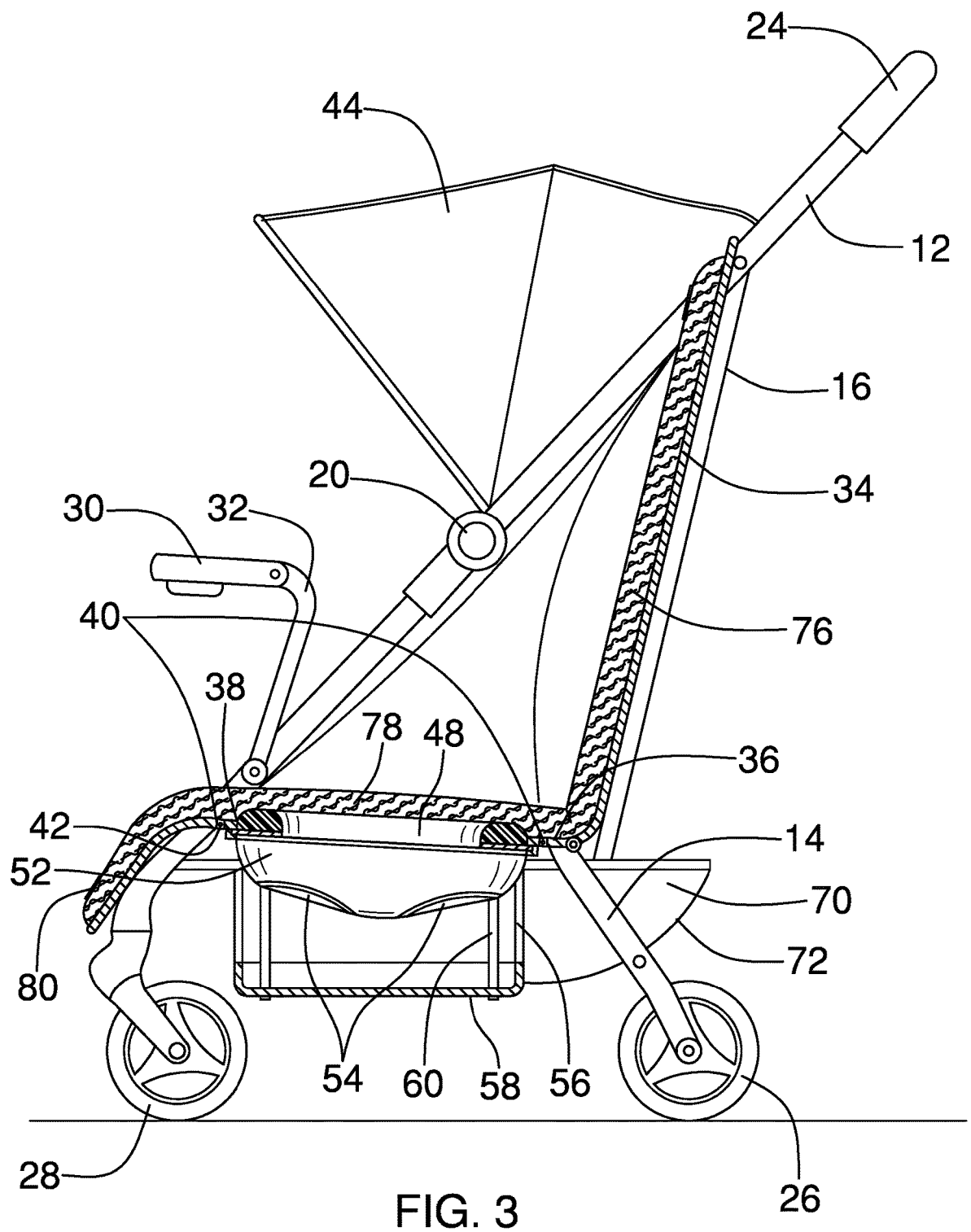
FIG. 3 is a cross-sectional view of an embodiment of the disclosure.
Figure 4:
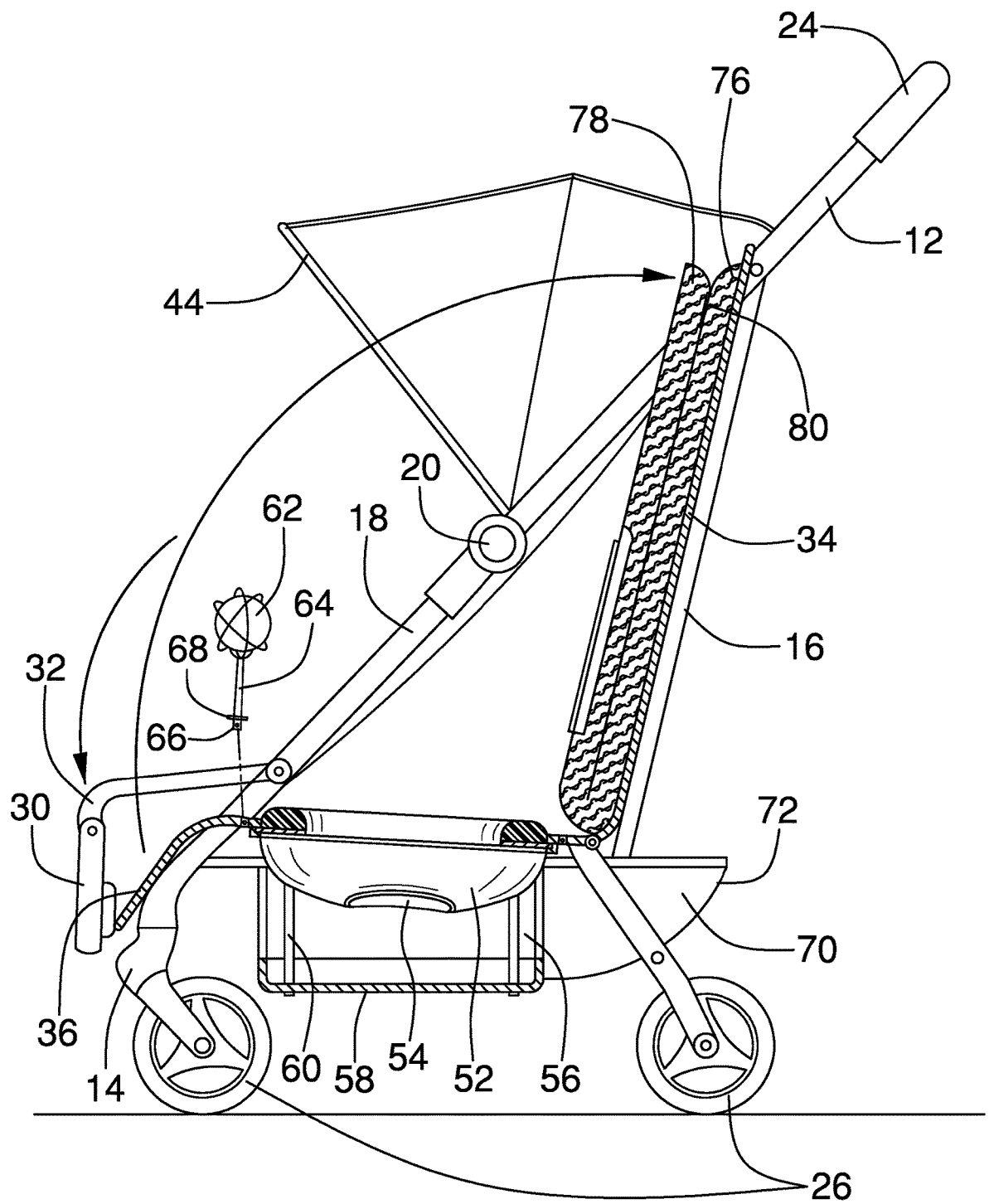
FIG. 4 is a cross-sectional view of an embodiment of the disclosure.

A pad back 76 is coupled to the seat back 34. A pad bottom 78 is coupled to the pad back 76. The pad bottom 78 is foldable and moves between an open position covering the seat bottom 36 (as shown in FIGS. 1-3) and a closed position parallel with the pad back 76 (as shown in FIG. 4). A plurality of engagement members 80 is coupled to the pad back 76 and the pad bottom 78. The plurality of engagement members 80 selectively secures the pad bottom 78 in the closed position to expose the swivel seat 46. The plurality of engagement members 80 may be, but is not limited to, selectively engageable fasteners such as hook-and-loop, buttons, snaps, zippers, and the like.

A plurality of vibroacoustic speakers 82 may be coupled within the pad bottom 78. The plurality of vibroacoustic speakers 82 has a power supply 84 and a transceiver 86 configured to be in operational communication with a personal electronic device to produce low frequency sinusoidal vibrations between 30-120 Hz. A tablet pocket 88 may be coupled to the pad bottom 78. The tablet pocket 88 is coupled to a pad underside 90 of the pad bottom and is configured to selectively receive a tablet. The child may thus view and manipulate the tablet while seated in the swivel seat 46. A seatbelt 92 may be coupled to the seat back 34 and the seat bottom 36. The seatbelt 92 extends through the pad back 76 and the pad bottom 78 for use while the pad bottom 78 is in the open position.

In use, the child may be placed in the apparatus 10 with the pad bottom 78 in the open position for traditional stroller use. The plurality of vibroacoustic speakers 82 may be activated to soothe the child as desired. The pad bottom 78 may alternatively be moved to the closed position with the plurality of engagement members 80 to expose the swivel seat 46.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A swivel seat stroller apparatus comprising:
   a frame, the frame including a plurality of wheel arms, a frame back, and a frame front;
   a handle coupled to the frame;
   a plurality of wheels coupled to the frame, the plurality of wheels being coupled to the plurality of wheel arms;
   a seat back coupled to the frame, the seat back being coupled to the frame back;
   a seat bottom coupled to the frame, the seat bottom having a seat aperture extending therethrough;
   a swivel seat coupled to the seat bottom, the swivel seat having a rim coupled to a seat top side of the seat bottom and a harness rotatably coupled to the rim, the harness extending through the seat aperture and having a pair of leg apertures;
   a pad back coupled to the seat back;
   a pad bottom coupled to the pad back, the pad bottom being foldable and moving between an open position covering the seat bottom and a closed position parallel with the pad back; and
   a plurality of engagement members coupled to the pad back and the pad bottom, the plurality of engagement members selectively securing the pad bottom in the closed position.

2. The swivel seat stroller apparatus of claim 1 further comprising the frame being foldable, the frame front having a pair of frame hinges.

3. The swivel seat stroller apparatus of claim 1 further comprising a tray coupled to the frame, the tray having a pair of tray arms pivotably coupled to the frame front.

4. The swivel seat stroller apparatus of claim 3 further comprising the tray having a pair of cupholders.

5. The swivel seat stroller apparatus of claim 1 further comprising a seatbelt coupled to the seat back and the seat bottom, the seatbelt extending through the pad back and the pad bottom.

6. The swivel seat stroller apparatus of claim 1 further comprising the seat bottom having a plurality of toy insert receptacles; a plurality of toys, each toy having a post selectively engageable with the plurality of toy insert receptacles.

7. The swivel seat stroller apparatus of claim 1 further comprising a canopy coupled to the frame, the canopy being coupled to the frame front and being collapsible.

8. The swivel seat stroller apparatus of claim 1 further comprising a tablet pocket coupled to the pad bottom, the tablet pocket being coupled to a pad underside of the pad bottom and being configured to selectively receive a tablet.

9. The swivel seat stroller apparatus of claim 1 further comprising a foot basket coupled to frame, the foot basket being positioned below the swivel seat.

10. The swivel seat stroller apparatus of claim 9 further comprising the foot basket having a basket bottom supported by a plurality of adjustable basket straps.

11. The swivel seat stroller apparatus of claim 9 further comprising a storage compartment coupled to the frame adjacent the foot basket.

12. The swivel seat stroller apparatus of claim 11 further comprising the storage compartment having a curved storage back side.

13. The swivel seat stroller apparatus of claim 1 further comprising a plurality of vibroacoustic speakers coupled within the pad bottom, the plurality of vibroacoustic speakers having a power supply and a transceiver configured to be in operational communication with a personal electronic device.

14. A swivel seat stroller apparatus comprising:
- a frame, the frame including a plurality of wheel arms, a frame back, and a frame front, the frame being foldable, the frame front having a pair of frame hinges;
- a handle coupled to the frame;
- a plurality of wheels coupled to the frame, the plurality of wheels being coupled to the plurality of wheel arms;
- a tray coupled to the frame, the tray having a pair of tray arms pivotably coupled to the frame front, the tray having a pair of cupholders;
- a seat back coupled to the frame, the seat back being coupled to the frame back;
- a seat bottom coupled to the frame, the seat bottom having a seat aperture extending therethrough, the seat bottom having a plurality of toy insert receptacles;
- a canopy coupled to the frame, the canopy being coupled to the frame front and being collapsible;
- a swivel seat coupled to the seat bottom, the swivel seat having a rim coupled to a seat top side of the seat bottom and a harness rotatably coupled to the rim, the harness extending through the seat aperture and having a pair of leg apertures;
- a foot basket coupled to frame, the foot basket being positioned below the swivel seat, the foot basket having a basket bottom supported by a plurality of adjustable basket straps;
- a plurality of toys, each toy having a post selectively engageable with the plurality of toy insert receptacles;
- a storage compartment coupled to the frame adjacent the foot basket, the storage compartment having a curved storage back side;
- a pad back coupled to the seat back;
- a pad bottom coupled to the pad back, the pad bottom being foldable and moving between an open position covering the seat bottom and a closed position parallel with the pad back;
- a plurality of engagement members coupled to the pad back and the pad bottom, the plurality of engagement members selectively securing the pad bottom in the closed position;
- a plurality of vibroacoustic speakers coupled within the pad bottom, the plurality of vibroacoustic speakers having a power supply and a transceiver configured to be in operational communication with a personal electronic device;
- a tablet pocket coupled to the pad bottom, the tablet pocket being coupled to a pad underside of the pad bottom and being configured to selectively receive a tablet; and
- a seatbelt coupled to the seat back and the seat bottom, the seatbelt extending through the pad back and the pad bottom.

\* \* \* \* \*